United States Patent
Buck (10) Patent No.: US 12,408,628 B2
(45) Date of Patent: Sep. 9, 2025

(54) GROOMING PET ENCLOSURE ASSEMBLY

(71) Applicant: Matthew Buck, Ventura, CA (US)

(72) Inventor: Matthew Buck, Ventura, CA (US)

( * ) Notice: Subject to any disclaimer, the term of this patent is extended or adjusted under 35 U.S.C. 154(b) by 87 days.

(21) Appl. No.: 18/082,286

(22) Filed: Dec. 15, 2022

(65) Prior Publication Data

US 2024/0196860 A1    Jun. 20, 2024

(51) Int. Cl.
*A01K 13/00* (2006.01)
*A01K 1/03* (2006.01)

(52) U.S. Cl.
CPC .............. *A01K 13/002* (2013.01); *A01K 1/03* (2013.01)

(58) Field of Classification Search
CPC . A01K 1/03; A01K 1/02; A01K 1/033; A01K 1/035; A01K 1/0107; A01K 13/002; A01K 13/004
USPC ................................ 119/513, 502, 667, 669
See application file for complete search history.

(56) References Cited

U.S. PATENT DOCUMENTS

| | | | | |
|---|---|---|---|---|
| 157,417 A | * | 12/1874 | Pitts | B62C 9/00 280/173 |
| 235,841 A | * | 12/1880 | Wright | A46B 3/12 15/204 |
| 1,627,516 A | * | 5/1927 | Larson | A01K 13/004 119/656 |
| 1,875,433 A | * | 9/1932 | Fitzpatrick | A01K 1/0035 119/504 |
| 2,865,329 A | * | 12/1958 | Elliott | A01K 13/004 119/622 |
| 3,475,780 A | * | 11/1969 | Hettich | A47L 23/02 15/36 |
| 3,862,620 A | * | 1/1975 | Bernhard et al. | A01K 31/02 292/162 |
| 4,161,924 A | * | 7/1979 | Welker | A01K 1/033 119/784 |
| 4,301,766 A | | 11/1981 | Piccone | |
| 4,696,259 A | * | 9/1987 | Fewox | A01K 1/02 119/482 |
| 4,938,169 A | * | 7/1990 | Barmakian | A01K 1/035 119/501 |
| 5,458,088 A | * | 10/1995 | Owens | A01K 13/002 119/622 |
| 5,517,946 A | * | 5/1996 | Udelle | A01K 13/004 119/622 |
| 5,546,895 A | | 8/1996 | Brown | |
| 5,551,371 A | * | 9/1996 | Markey | A01K 1/033 119/482 |
| 5,755,183 A | * | 5/1998 | Udelle | A01K 13/004 119/622 |
| 7,578,264 B2 | | 8/2009 | Guard | |

(Continued)

FOREIGN PATENT DOCUMENTS

| CA | 2769911 | | 2/2012 | |
|---|---|---|---|---|
| GB | 2177282 A | * | 1/1987 | A01K 1/033 |

*Primary Examiner* — Monica L Perry
*Assistant Examiner* — Maria E Graber (57) ABSTRACT

A grooming pet enclosure assembly for removing loose hair from a pet includes a plurality of panels, the panels of which are selectively mutually attachable so that the plurality of panels defines a tubular pen that can house a pet. At least one cutout is positioned in the plurality of panels. A plurality of bristles is attached to the plurality of panels and extends into the at least one cutout to define an opening, which is substantially circular. The bristles groom the pet as the pet passes through the opening.

13 Claims, 6 Drawing Sheets

(56) References Cited

U.S. PATENT DOCUMENTS

| | | | | |
|---|---|---|---|---|
| 8,056,512 B2* | 11/2011 | Craig | ............... | G09F 9/40 |
| | | | | 119/501 |
| D667,177 S | 9/2012 | Roberts | | |
| 8,640,652 B2* | 2/2014 | Callari | ............... | A01K 1/035 |
| | | | | 119/702 |
| 9,078,413 B1 | 7/2015 | Docy | | |
| 9,591,831 B2* | 3/2017 | Chura | ............... | A01K 13/002 |
| 9,986,719 B1* | 6/2018 | Sanders | ............... | A01K 13/002 |
| 10,111,404 B1* | 10/2018 | Herbert | ............... | A46B 9/02 |
| 11,613,925 B2* | 3/2023 | Harrington | ............... | E06B 7/32 |
| | | | | 119/622 |
| 11,840,880 B2* | 12/2023 | Lain | ............... | E06B 7/32 |
| 2005/0028745 A1 | 2/2005 | Baille | | |
| 2010/0313822 A1* | 12/2010 | Huang | ............... | A01K 1/034 |
| | | | | 119/474 |
| 2011/0079181 A1* | 4/2011 | Craig | ............... | A01K 1/0017 |
| | | | | 119/416 |
| 2012/0222627 A1* | 9/2012 | Chura | ............... | A01K 13/002 |
| | | | | 119/622 |
| 2016/0338316 A1* | 11/2016 | Niedwick | ............... | A01K 1/0353 |
| 2017/0135314 A1* | 5/2017 | Chura | ............... | A01K 13/002 |
| 2017/0303507 A1* | 10/2017 | Kuo | ............... | A01K 13/004 |
| 2020/0040650 A1* | 2/2020 | Harrington | ............... | A01K 13/002 |
| 2023/0263129 A1* | 8/2023 | Yu | ............... | A01K 1/03 |
| | | | | 119/452 |

* cited by examiner

GROOMING PET ENCLOSURE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to pet enclosures and more particularly pertains to a new pet enclosure for removing loose hair from a pet. The present invention discloses a modular pet enclosure that brushes a pet as it enters and exit through an opening.

(2) Description of Related Art Including Information Disclosed Under 37 CFR 1.97 and 1.98

The prior art relates to pet enclosures. Related prior art comprises bristled tunnels, stackable cubes having multiple bristled openings, bristled pet doors for ingress and egress from a structure, portable pet shelters with bristled openings, and litter boxes with bristled openings. The prior art does not teach a pen for pets having a bristled opening.

BRIEF SUMMARY OF THE INVENTION

An embodiment of the disclosure meets the needs presented above by generally comprising a plurality of panels, the panels of which are selectively mutually attachable so that the plurality of panels defines a tubular pen. The tubular pen is configured to house a pet. At least one cutout is positioned in the plurality of panels. A plurality of bristles is attached to the plurality of panels and extends into the at least one cutout to define an opening, which is substantially circular. The bristles are configured to groom the pet as the pet passes through the opening.

An embodiment of the disclosure includes a method of grooming a pet comprising a first step, which entails providing a grooming pet enclosure assembly 10, according to the disclosure above. A second step of the method is mutually attaching the panels to form a tubular pen. A third step of the method is allowing a pet to enter and exit the tubular pen via the opening, such that hair of the pet is brushed by the plurality of bristles.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 8 thereof, a new pet enclosure embodying the principles and concepts of an embodiment of the disclosure and generally designated by the reference numeral 10 will be described.

Figure 4:
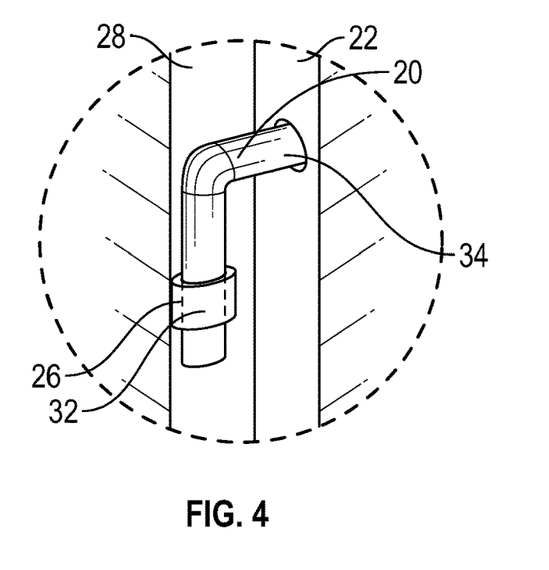
FIG. 4 is a detail view of an embodiment of the disclosure.
Figure 5:
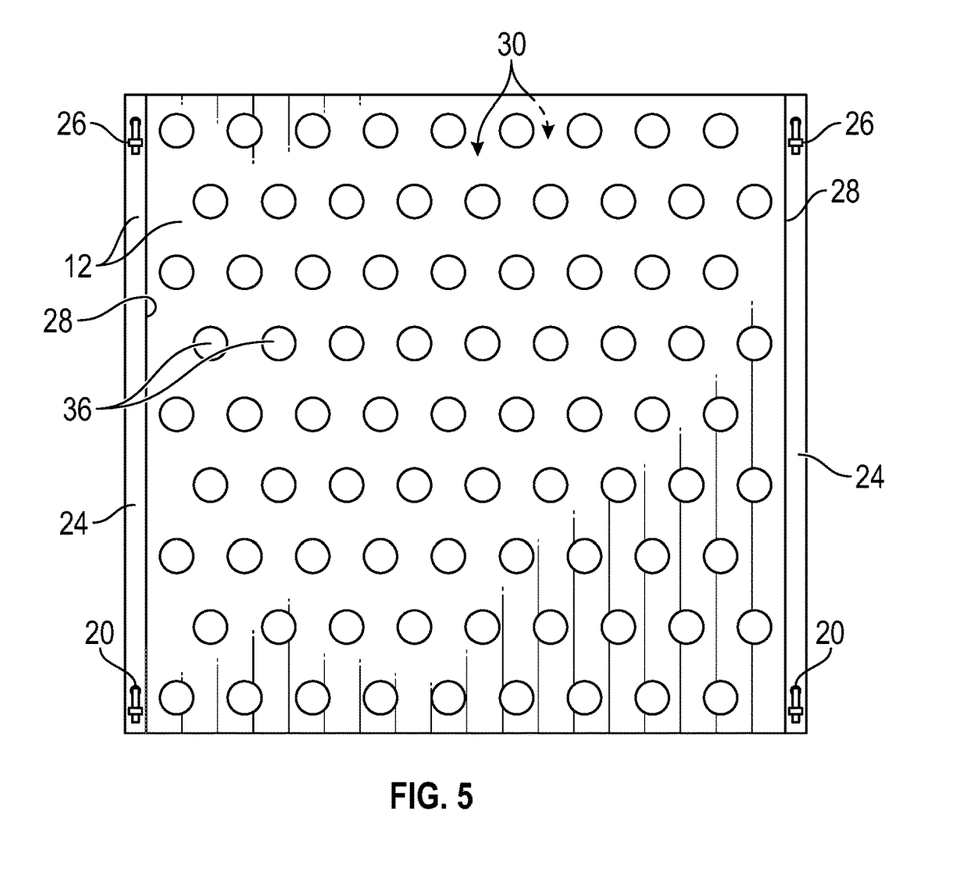
FIG. 5 is a side view of an embodiment of the disclosure.
Figure 6:
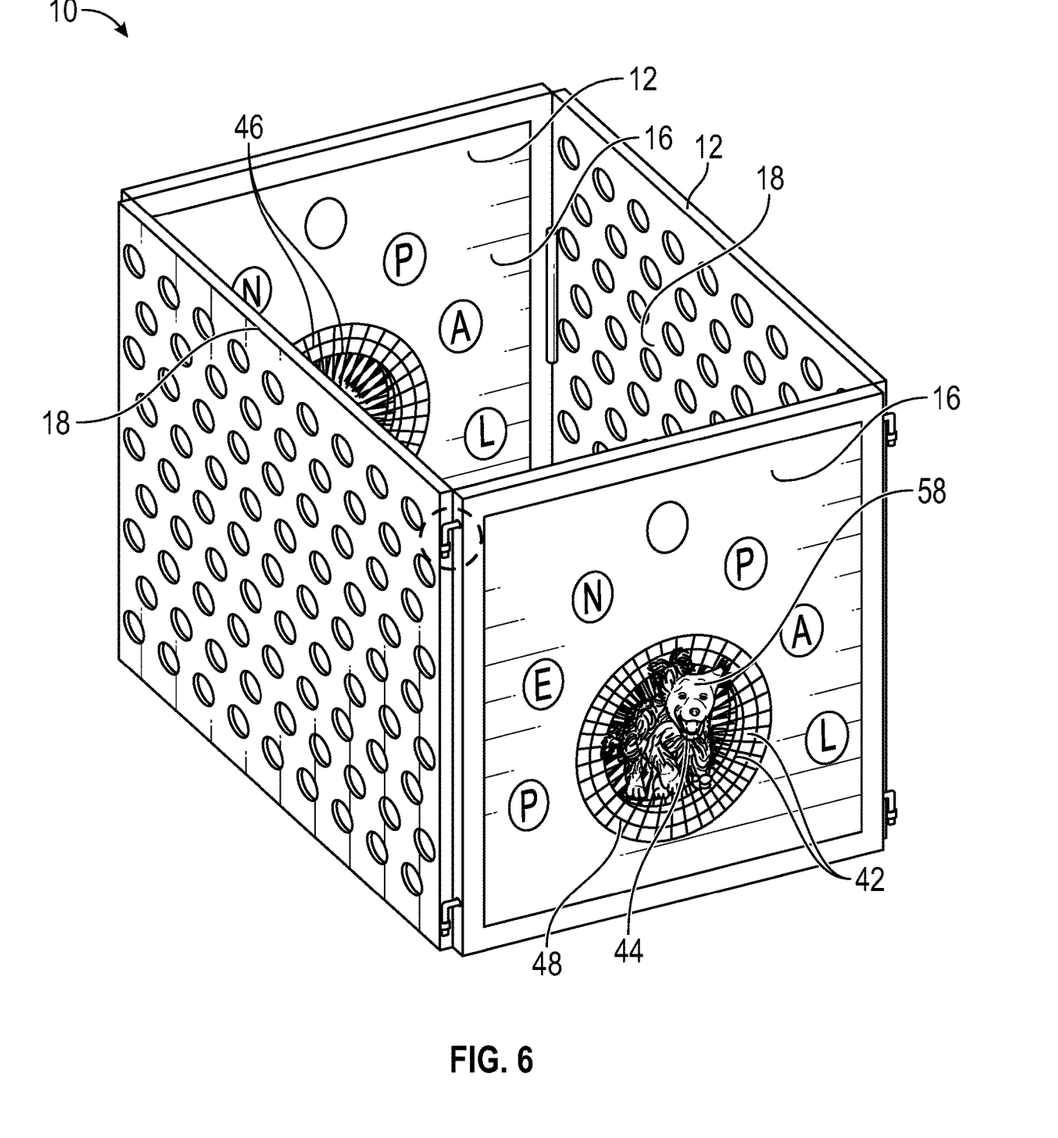
FIG. 6 is an in-use view of an embodiment of the disclosure.
Figure 7:
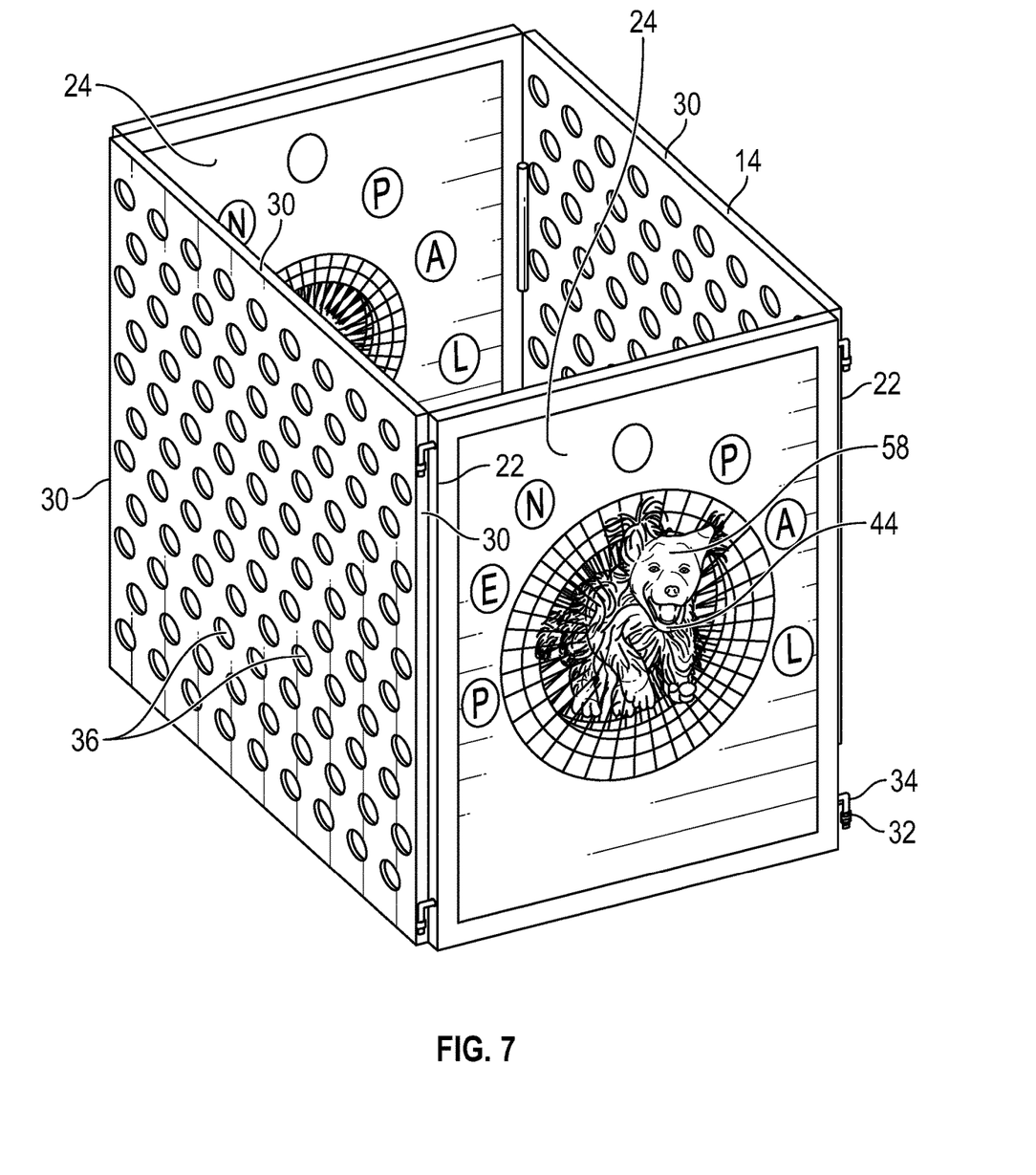
FIG. 7 is an in-use view of an embodiment of the disclosure.

As best illustrated in FIGS. 1 through 8, the grooming pet enclosure assembly 10 generally comprises a plurality of panels 12, the panels 12 of which are selectively mutually attachable so that the plurality of panels 12 defines a tubular pen 14. The tubular pen 14 is configured to house a pet 58. The plurality of panels 12 comprises from two to eight panels 12. The panels 12 can be sized to as to create tubular pens 14 of various sizes, as shown in FIGS. 6 and 7, to accommodate pets 58 of various sizes.

Figure 3:
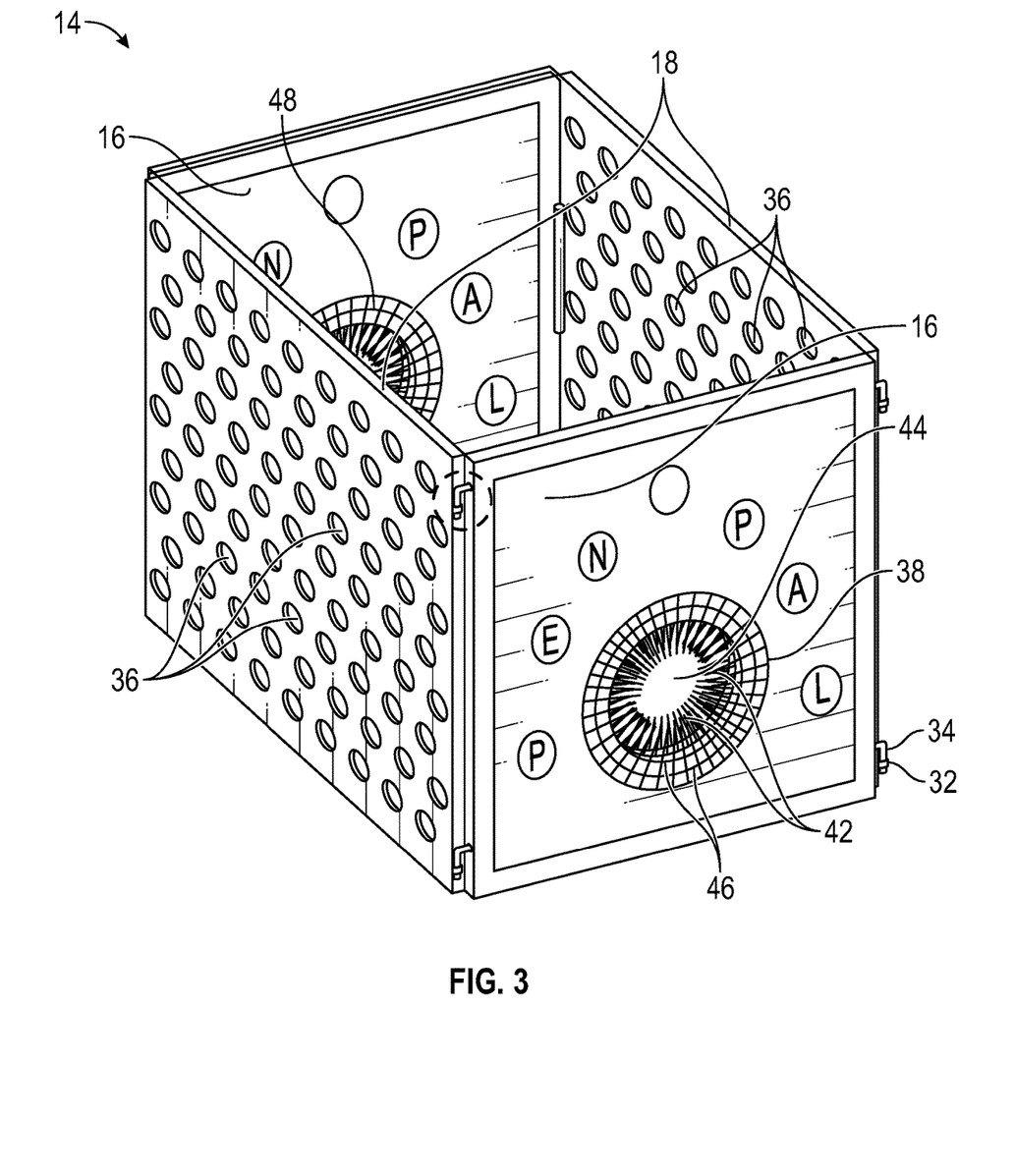
FIG. 3 is an isometric perspective view of an embodiment of the disclosure.

As shown in FIG. 3, the plurality of panels 12 comprises a pair of end panels 16 and a pair of side panels 18. The panels 12 shown are planar so that the tubular pen 14 is cuboid. The present invention anticipates other numbers of panels 12, such as five panels 12 to create a tubular pen 14 that is pentagonal, three panels 12 to create a tubular pen 14 that is triagonal, and the like. Additionally, panels 12 that are arcuate are anticipated for creating tubular pens 14 that are ovoid, circular, and the like. The present invention also anticipates the plurality of panels 12 comprising one or both of a roof panel and floor panel (not shown).

Figure 1:
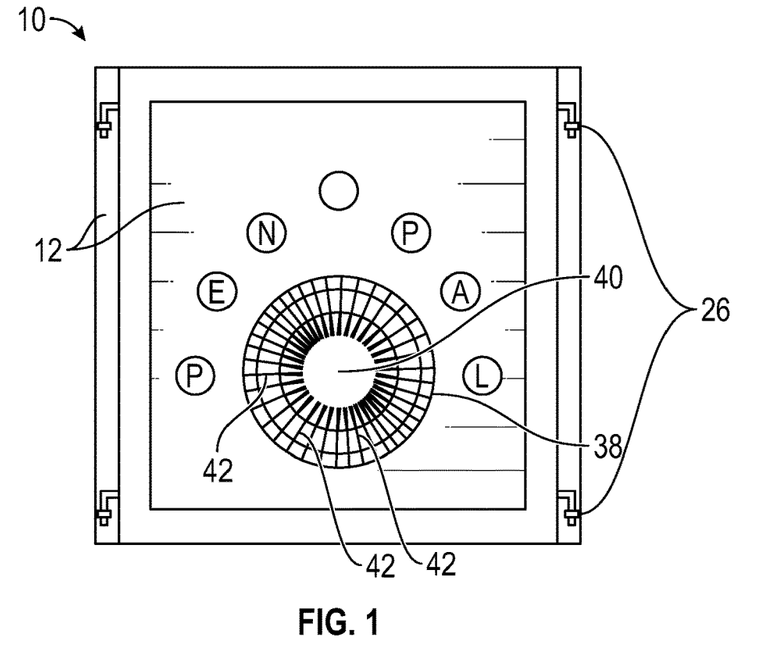
FIG. 1 is a front view of a grooming pet enclosure assembly according to an embodiment of the disclosure.
Figure 2:
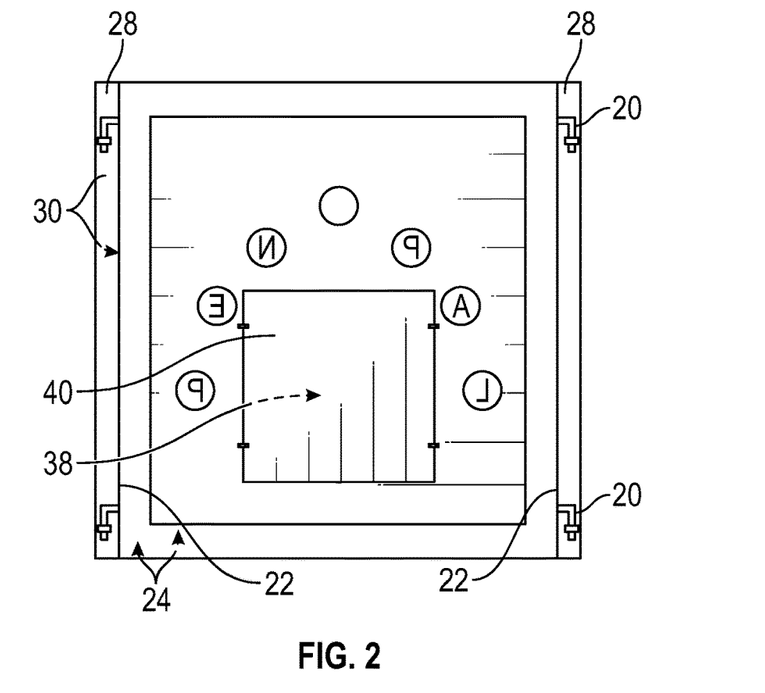
FIG. 2 is a rear view of an embodiment of the disclosure.

A plurality of first connectors 20 is attached to opposed sides 22 of a first set 24 of the panels 12 so that each opposed side 22 of each panel 12 of the first set 24 of panels 12 has at least one first connector 20. As shown in FIGS. 1 and 2, each opposed side 22 of each panel 12 of the first set 24 of the panels 12 has two first connectors 20. A plurality of second connectors 26 is attached to opposing sides 28 of a second set 30 of the panels 12 so that each opposing side 28 of each panel 12 of the second set 30 of the panels 12 has at least one second connector 26. The second connectors 26 are complementary to the first connectors 20 so that each second connector 26 is positioned to selectively engage a respective first connector 20 to removably attach the panels 12 to form the tubular pen 14.

Each second connector 26 may comprise a tube 32 and each first connector 20 may comprise an L-shaped hook 34. The present invention also anticipates the first connectors 20 and the second connectors 26 comprising other connecting means, or combinations of connecting means. For example, each end panel 16 may be hingedly attached to an associated side panel 18. In another example, each first connector 20 and a respective second connector 26 could comprise a hook and loop fastener (not shown).

As shown in FIG. 5, a plurality of holes 36 is positioned in the pair of side panels 18. The holes 36 allow a pet 58 to view an area proximate to the tubular pen 14 and reduce anxiety of the pet 58.

At least one cutout 38 is positioned in the plurality of panels 12. As shown in FIG. 1, the at least one cutout 38 is substantially circular, although the present invention also anticipates the at least one cutout 38 being alternatively shaped, such as, but not limited to, square, ovoid, and the like. As shown in FIG. 3, two cutouts 38 are positioned singly in the end panels 16.

The grooming pet enclosure assembly 10 also may comprise at least one plate 40, which is selectively attachable to the plurality of panels 12 to close the at least one cutout 38. The plate 40 can be attached to a respective panel 12 by attachment means known to those skilled in the art of closures for openings, such as, but not limited to, hinged doors with clasps, sliding doors, complementary fasteners positioned upon the plate 40 and the respective panel 12, and the like.

A plurality of bristles 42 is attached to the plurality of panels 12 and extends into the at least one cutout 38 to define an opening 44, which is substantially circular. The bristles 42 are configured to groom the pet 58 as the pet 58 passes through the opening 44. The grooming pet enclosure assembly 10 is anticipated to be useful in reducing an amount of hair from a pet 58 that accumulates in a home and hair that is transferred by a pet 58 to furniture, clothing, bedding, and the like. A user can entice the pet 58 into the tubular pen 14 with toys, water, food, treats, and other means. Additionally, for a pet 58 that can be lifted by a user, the pet 58 can simply be lifted and positioned in the tubular pen 14.

The grooming pet enclosure assembly 10 also may comprise a plurality of endless bands 46, which is attached to the bristles 42 of the plurality of bristles 42. Each endless band 46 has a respective circumference 48 so that the plurality of endless bands 46 comprises endless bands 46 having a variety of circumferences 48. The endless bands 46 are elastic and concentrically positioned on the plurality of bristles 42. The endless bands 46 are configured to stretch and to rebound as the pet 58 passes through the opening 44, thereby increasing an effectiveness of the bristles 42 in grooming the pet 58.

Figure 8:
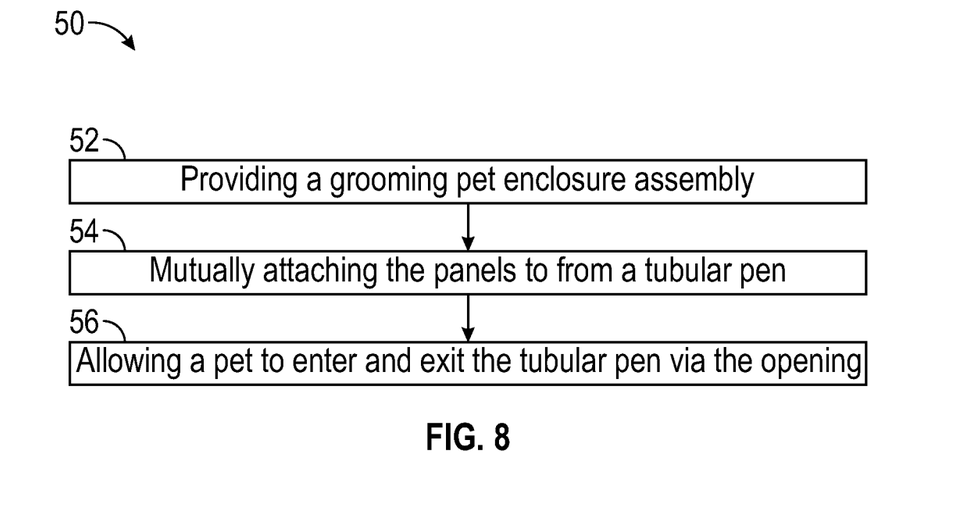
FIG. 8 is a flow diagram for a method utilizing an embodiment of the disclosure.

The grooming pet enclosure assembly 10 enables a method of grooming a pet 50. The method 50 comprises a first step 52, which entails providing a grooming pet enclosure assembly 10, according to the specification above. A second step 54 of the method 50 is mutually attaching the panels 12 to form a tubular pen 14. A third step 56 of the method 50 is allowing a pet 58 to enter and to exit the tubular pen 14, via the opening 44, so that hair of the pet 58 is brushed by the plurality of bristles 42.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A grooming pet enclosure assembly comprising:
   a plurality of panels, the panels being selectively mutually attachable, such that the plurality of panels defines a tubular pen, wherein the tubular pen is configured for housing a pet;
   at least one cutout positioned in the plurality of panels;
   a plurality of bristles attached to the plurality of panels and extending into the at least one cutout around a full perimeter of the at least one cutout defining an opening, the opening being substantially circular, wherein the bristles are configured for grooming the pet as the pet passes through the opening; and
   a plurality of endless bands distally attached to the bristles of the plurality of bristles, each endless band having a respective circumference such that the plurality of endless bands comprises endless bands having a variety of circumferences, the endless bands being elastic and concentrically positioned on the plurality of bristles, wherein the endless bands are configured for stretching and rebounding as the pet passes through the opening.

2. The grooming pet enclosure assembly of claim 1, wherein the at least one cutout is substantially circular.

3. The grooming pet enclosure assembly of claim 1, further including at least one plate selectively attachable to the plurality of panels for closing the at least one cutout.

4. The grooming pet enclosure assembly of claim 1, further including:
   a plurality of first connectors attached to opposed sides of a first set of panels of the plurality of panels, such that each opposed side of each panel of the first set of panels has at least one first connector; and
   a plurality of second connectors attached to opposing sides of a second set of panels of the plurality of panels, such that each opposing side of each panel of the second set of panels has at least one second connector, the second connectors being complementary to the first connectors, such that each second connector is positioned for selectively engaging a respective first connector for removably attaching the plurality of panels for forming the tubular pen.

5. The grooming pet enclosure assembly of claim 4, wherein each opposed side of each panel of the first set of panels has two first connectors.

6. The grooming pet enclosure assembly of claim 4, wherein:
each second connector comprising a tube; and
each first connector comprising an L-shaped hook.

7. The grooming pet enclosure assembly of claim 1, wherein the plurality of panels comprises two to eight panels.

8. The grooming pet enclosure assembly of claim 7, wherein the plurality of panels comprises a pair of end panels and a pair of side panels.

9. The grooming pet enclosure assembly of claim 8, wherein each of the panels of the plurality of panels is planar, such that the tubular pen is cuboid.

10. The grooming pet enclosure assembly of claim 9, further including a plurality of holes positioned in the pair of side panels.

11. The grooming pet enclosure assembly of claim 8, wherein the plurality of cutouts is two cutouts and the two cutouts are positioned singly in the end panels.

12. A grooming pet enclosure assembly comprising:
a plurality of panels, the panels being selectively mutually attachable, such that the plurality of panels defines a tubular pen, wherein the tubular pen is configured for housing a pet, the plurality of panels comprising a pair of end panels and a pair of side panels, each of the panels of the plurality of panels being planar, such that the tubular pen is cuboid;
a plurality of holes positioned in the pair of side panels;
a plurality of first connectors attached to opposed sides of a first set of the panels, such that each opposed side of each panel of the first set of the panels has at least one first connector, each opposed side of each panel of the first set of the panels having two first connectors;
a plurality of second connectors attached to opposing sides of a second set of the panels, such that each opposing side of each panel of the second set of panels has at least one second connector, the second connectors being complementary to the first connectors, such that each second connector is positioned for selectively engaging a respective first connector for removably attaching the panels for forming the tubular pen, each second connector comprising a tube, each first connector comprising an L-shaped hook;
two cutouts positioned in the plurality of panels, each cutout being substantially circular, the two cutouts being positioned singly in the end panels;
at least one plate selectively attachable to the plurality of panels for closing the at least one cutout;
a plurality of bristles attached to the plurality of panels and extending into each of the two cutouts around a full perimeter of each of the two cutouts such that the plurality of bristles defines an opening, the opening being substantially circular, wherein the plurality of bristles is configured for grooming the pet as the pet passes through the opening; and
a plurality of endless bands distally attached to the bristles of the plurality of bristles, each endless band having a respective circumference, such that the plurality of endless bands comprises endless bands having a variety of circumferences, the endless bands being elastic and concentrically positioned on the plurality of bristles, wherein the endless bands are configured for stretching and rebounding as the pet passes through the opening.

13. A method of grooming a pet comprising the steps of;
providing a grooming pet enclosure assembly comprising:
a plurality of panels, the panels being selectively mutually attachable, such that the plurality of panels defines a tubular pen, wherein the tubular pen is configured for housing a pet,
at least one cutout positioned in the plurality of panels, and
a plurality of bristles attached to the plurality of panels and extending into the at least one cutout around a full perimeter of each of the at least one cutout defining an opening, the opening being substantially circular, wherein the plurality of bristles is configured for grooming the pet as the pet passes through the opening;
a plurality of endless bands attached to the bristles of the plurality of bristles, each endless band having a respective circumference such that the plurality of endless bands comprises endless bands having a variety of circumferences, the endless bands being elastic and concentrically positioned on the plurality of bristles, wherein the endless bands are configured for stretching and rebounding as the pet passes through the opening;
mutually attaching the panels to form a tubular pen; and
allowing a pet to enter and exit the tubular pen via the opening, such that hair of the pet is brushed by the plurality of bristles.

\* \* \* \* \*